March 29, 1938. C. L. HILL 2,112,490
AUTOMATIC SHIP CONTROLLING APPARATUS
Filed Feb. 8, 1932 4 Sheets-Sheet 1

Inventor
Curtiss L. Hill.
By
Attorney

March 29, 1938. C. L. HILL 2,112,490
AUTOMATIC SHIP CONTROLLING APPARATUS
Filed Feb. 8, 1932 4 Sheets-Sheet 2

Fig. 2.

Inventor
Curtiss L. Hill.
By Munson H. Lane
Attorney

March 29, 1938. C. L. HILL 2,112,490
AUTOMATIC SHIP CONTROLLING APPARATUS
Filed Feb. 8, 1932 4 Sheets-Sheet 3

Inventor
Curtiss L. Hill
Munson H. Lane
By
Attorney

March 29, 1938.  C. L. HILL  2,112,490
AUTOMATIC SHIP CONTROLLING APPARATUS
Filed Feb. 8, 1932  4 Sheets-Sheet 4

Inventor
Curtiss L. Hill
By Munson H. Lane
Attorney

Patented Mar. 29, 1938

2,112,490

UNITED STATES PATENT OFFICE 2,112,490

AUTOMATIC SHIP CONTROLLING APPARATUS

Curtiss L. Hill, Tacoma, Wash., assignor of one-half to R. Clayton McRae, Tacoma, Wash.

Application February 8, 1932, Serial No. 591,686

27 Claims. (Cl. 172—282)

My invention relates to steering apparatus of the kind disclosed in my application for Compass control system filed March 11, 1931, Serial No. 521,771, now Patent No. 1,885,098, dated October 25, 1932, in which a reversible motor operates the steering apparatus of a dirigible structure and is in turn controlled by a single light-sensitive element.

In my prior patent the claims are directed primarily to the compass features whereas the claims in the present application are directed to a steering system and more particularly to automatic ship steering apparatus. Some of the features included in the claims of the present application are common to the disclosures of both cases whereas others are in the nature of improvements. According to the disclosures of both cases the amount of light which is shed upon the light sensitive element is governed by means including a compass casing which is adapted to turn with the ship and a compass card which of course tends to point always in a fixed direction.

According to my prior patent slight variations in the relative position of the compass card and casing were adapted to be transmitted immediately to the ship's rudder. I have now found it preferable that only substantial movements of the compass casing to the right or left of a given position should result in moving the rudder and consequently in steering the ship, while intermediate variations should not be transmitted to the ship steering apparatus.

According to the specific embodiment of the invention disclosed in the present application, the light-sensitive element and other optical devices are mounted on a compass-casing which is geared to the motor that drives the steering apparatus, and the light-sensitive element is governed by the relative angular position of the compass card and casing. There is a lost motion connection between the motor and the steering apparatus so that slight deviations of the compass casing from its predetermined angular relation to the compass card will be instantly corrected without affecting the steering apparatus, but when there is a perceptible departure of the vessel or other controlled structure from its prescribed course, the lost-motion connection will become operative and the steering apparatus, as well as the compass casing, will function until the structure is restored to its proper course. This action continues indefinitely as long as the ship is in motion and the parts of my invention are set for operation.

One feature of my invention resides in the connection between the pilot wheel or its equivalent and its driving mechanism whereby the wheel may be released for manual operation, and whereby it may be rotatively adjusted relative to the driving mechanism and then locked in its adjusted position when it is desired to change the course of the ship or other structure.

Another feature consists in providing a lost motion connection between the motor and the steering devices while maintaining a constant connection between the motor and compass casing, whereby the compass casing may be continually oriented without disturbing the rudder unless there is sufficient deviation to require its operation.

Still another feature is the interlocking arrangement whereby the motor cannot be subjected to full voltage except when it is actually doing work driving the steering apparatus.

Further features are the arrangement for conducting electrical energy from the movably mounted light-sensitive device to fixed terminals from which it may be conducted to the amplifying element; the construction of the compass card; and other novel parts and combinations which will be pointed out in the claims.

In the accompanying drawings.

In the drawings, the same characters designate the same parts throughout.

Figure 1:
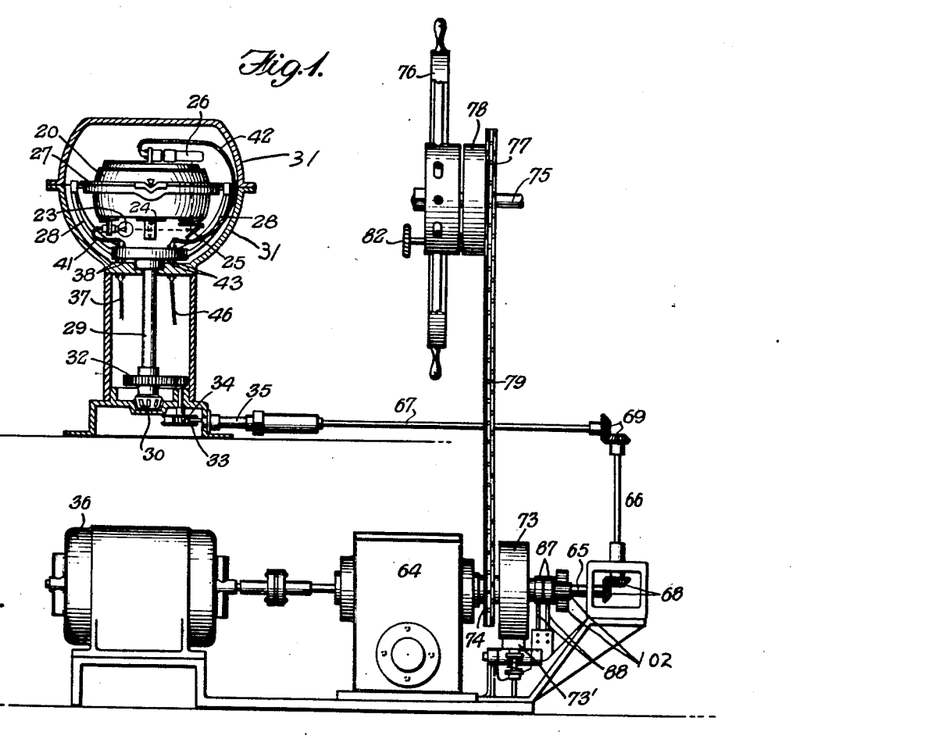
Figure 1 is a general view showing the driving mechanism for the steering wheel and its controlling mechanisms.

Referring to Figure 1, this view shows, among other features, the compass assembly, which is mounted at any convenient point on the ship. This assembly includes the compass casing 20, which has therein the magnetic compass card 21, Fig. 8. This card has a portion of its periphery cut away leaving sectors 22 so that when the card is in certain positions, a light beam projected by the small automobile headlight 23 through the lens 24, and reflected by mirror 25 is either passed to the photo-electric tube 26 or intercepted by the card, depending upon the position of the card with respect to the casing. The light train and the photo-electric tube are mounted upon and fixed with respect to the compass casing, and are, therefore, always in proper focus. The light and lens system is so arranged that an image of the filament is projected at the plane of the card. This gives a very small light beam at this point of the train and permits either the complete passage or complete interception of the light beam upon a very small movement of the card.

Figures 7, 8, 11, 12, 13:
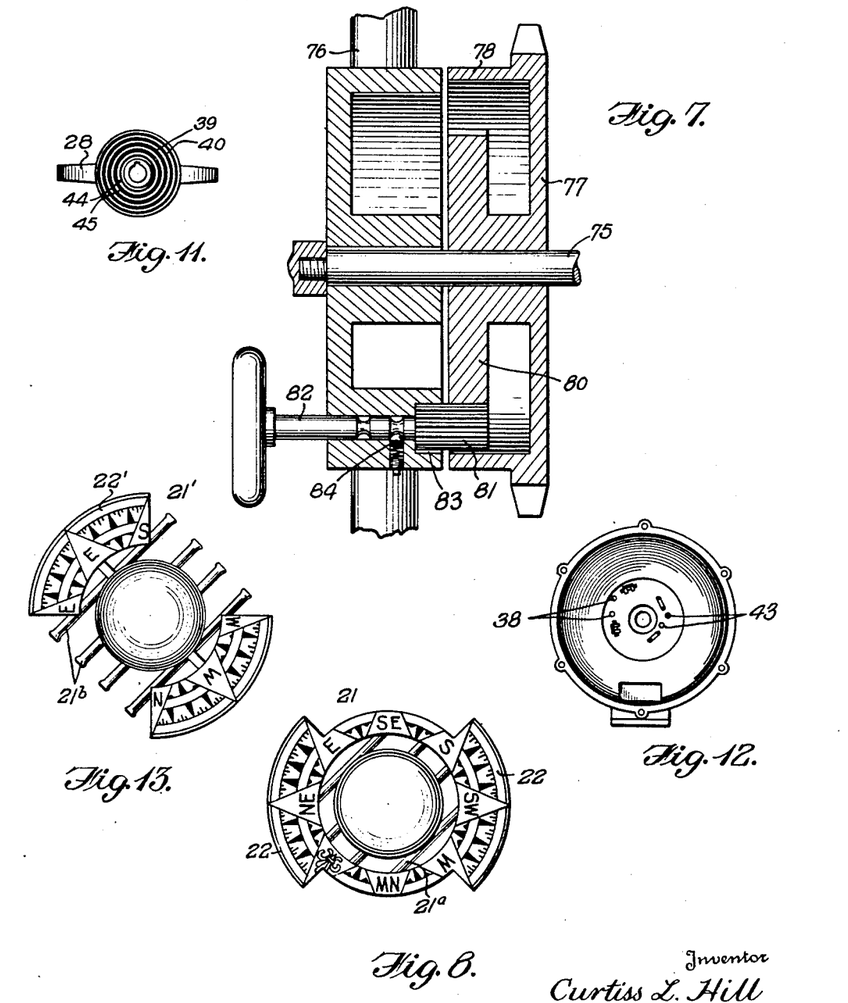
Figure 7 is a view of the pilot wheel and its driving sprocket together with the clutch gearing by means of which the wheels may be locked together or released and adjusted relative to each other.
Figure 8 is a plan view of the compass card.
Fig. 11 is a bottom plan of the yoke which supports the compass, showing the collector rings for the circuits leading to and from the instrumentalities mounted on the compass casing.
Fig. 12 is a top plan of the lower section of the compass bowl, showing the brushes inside the bowl that cooperate with the collector rings on the yoke.
Fig. 13 is a top plan of a modified form of compass card.
Figure 9:
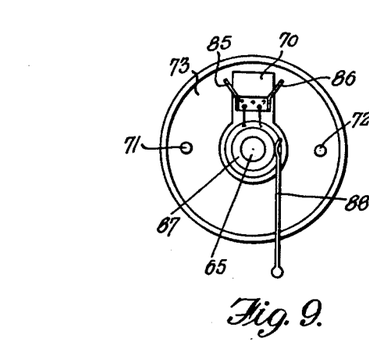
Figure 9 is a view of the driving arm and sprocket drum with their electric connections looking from the right of Figure 10.

Magnetic elements 21a are mounted diagonally on the compass card. This arrangement may be used to bring the operating end of the sector 22 into position to cooperate with the light beam when the ship is headed north, so that adjustments of the pilot wheel with respect to its driving mechanism may be made from a point on a north and south line as the zero point. The diagonal arrangement also preserves the symmetry of the card so that it is balanced on its pivot.

The compass casing is mounted in the usual gimbal, 27, which in turn bears on the supporting yoke 28. This yoke holds the whole compass assembly and allows free movement of the compass casing about any horizontal axis. It will be seen that if the yoke is rotated in one direction or the other, the light beam will either fall on the photo-electric tube or be intercepted by the card, since the card always remains stationary. This yoke is mounted on a vertical shaft, 29, which has a Timken bearing 30 at its lower end to take the weight with as little friction as possible. The upper end of this vertical shaft is supported in a sleeve bearing in the binnacle proper 31.

At the lower end of the vertical shaft is a spur reduction gear 32, and at the lower end of the pinion shaft a worm gear 33 is mounted. Engaging this worm gear is a worm 34 mounted on a horizontal shaft 35 which protrudes from the base of the binnacle. The total gear reduction is 266⅔ to 1.

In the lower part of Figure 1 is shown the main steering motor, 36, which in this case is a ¼ H. P. series wound, direct current motor geared down 300 to 1.

Current is led to the light 23 from any suitable source, through conductors 37, brushes 38, Fig. 12, collecting rings 39, 40 on yoke 28, Fig. 11, and conductors 41. Current is led from the photo-electric cell 26, through conductors 42, brushes 43, collector rings 44, 45, and conductors 46 to the amplifying portion 47 of a photo-electric relay, Figure 2. This relay may be of a standard type, identified in my hereinbefore mentioned prior Patent No. 1,885,098 dated October 25, 1932.

Figure 2:
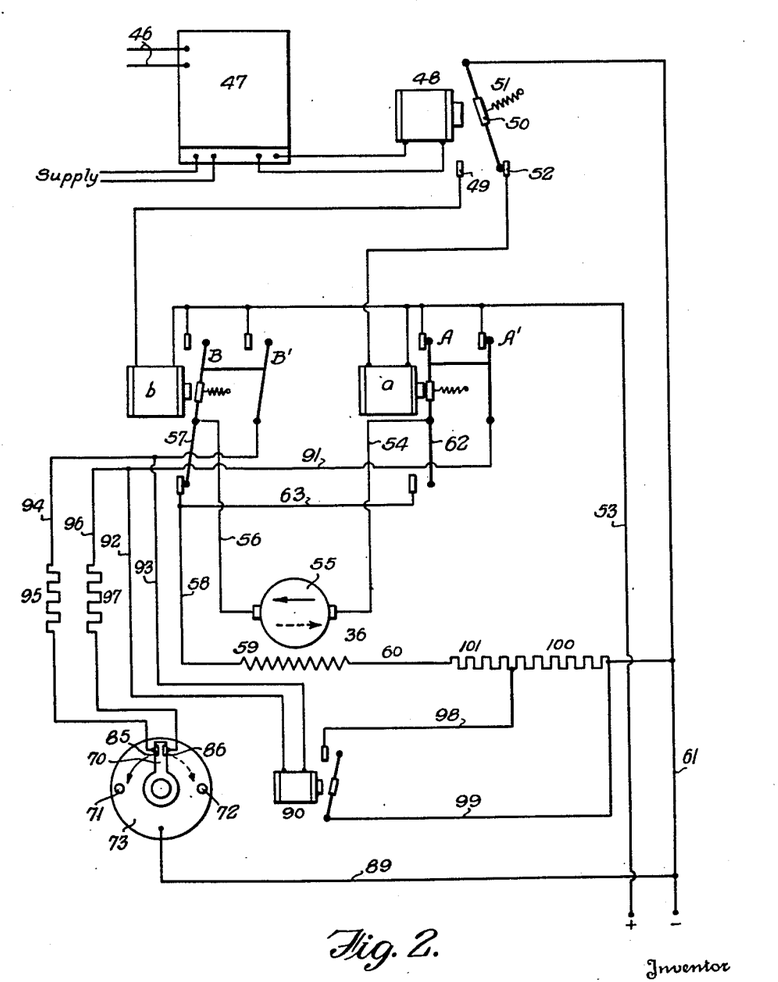
Figure 2 is a diagrammatic view of the controlling and motor operating circuits.

A sensitive relay 48 is actuated by current from the amplifier 47 in such a manner that when light falls on the tube, the sensitive relay closes and contact 49 is engaged by the arm carrying the armature 50. When no light falls on the tube, the spring 51 pulls the arm to engagement with contact 52. This amplifier is actually a part of the standard photo-electric relay, but since it is used somewhat differently, I have shown it outside the casing of the standard relay.

Two magnetic reversing switches A and B are controlled by the sensitive relay. When the latter is in the position shown, switch A is closed by means of magnet a, and current flows from the source through conductor 53, switch A, conductor 54, armature 55 of the steering motor 36 in the direction shown by the solid arrow, conductor 56, arm 57 on switch B, conductor 58, motor field 59, and conductors 60, 61 to the source. When the sensitive relay is energized, current flows through magnet b, switch B closes, switch A opens and energy from the source flows through conductor 53, switch B, conductor 56, armature 55, in the direction shown by the dotted arrow, conductor 54, arm 62 on switch A, conductors 63, 58, motor field 59 and conductors 60, 61 to the source. This reverses the motor. It will be observed that switches A and B can never be closed at the same time.

The function of the apparatus thus far described is such that when light falls on the photo-electric tube, that is: when the card is in such a position that the cut-away portion does not intercept the light beam, the motor revolves in one direction; and when the beam is intercepted, the motor revolves in the other direction. This motor through the reduction gearing 64 is connected through suitable shafting 65, 66, 67, and bevel gears 68, 69, to the shaft 35 of the worm driving the compass assembly in the binnacle. The motor, therefore, drives the compass assembly back and forth through a small arc in the neighborhood of ½ of 1 degree with respect to the position of the card. If the light beam is intercepted, the motor revolves in such a way that the compass assembly, and consequently the light beam, moves towards the cut-away portion of the card. When light falls on the photo tube, the motor revolves in such a direction that the compass assembly and light beam move toward the portion of the card that is not cut away. Consequently, the compass assembly has a "hunting" motion back and forth across one edge of the cut-away portion of the card, which in actual practice makes the compass assembly always follow the position of the card. It is in fact then a compass itself and remains at all times in substantially the same relative position with respect to the card.

Figure 10:
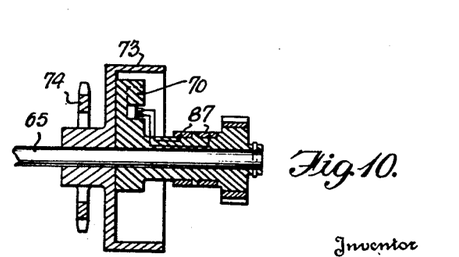
Figure 10 is a vertical section on a plane passing through the shaft shown in Figure 9.

In order that this apparatus may be made to steer a ship, there is mounted on the same shaft 65 which drives the compass assembly back and forth an arm 70 which engages two driving studs 71, 72, on the brake drum 73 attached to the sprocket 74 shown in Figure 10. This sprocket with the friction brake drum attached is free to revolve on the shaft as shown, but when the arm engages either of the two driving studs, the sprocket is revolved in one direction or the other.

Studs 71, 72, are adjusted to suit the gap to particular conditions. They cannot be adjusted when the device is in operation, but are fixed upon installation.

Loosely mounted on the same shaft 75 is the steering wheel 76 and just back of it is a sprocket 77 having a flange 78. This sprocket carries the chain 79 from the steering motor assembly and is free to revolve on the shaft. Concentric with the sprocket and attached thereto is a spur gear 80 which is engaged by a pinion 81 carried in the hub of the steering wheel. This pinion is fixed to a shaft which passes through the hub, and mounted on the outer end of the shaft is a small hand wheel 82. An internal gear 83 of the same pitch and pitch diameter is cut in the inside face of the hub so that when the hand wheel is pulled out, the sprocket and steering wheel are tightly locked together, since the pinion still engages the spur gear attached to the sprocket. If the hand wheel is pushed in about one-half inch, the sprocket and steering wheel are no longer locked together. The hand wheel can now be turned by hand and the steering wheel will be turned with respect to the sprocket. The amount of rotation may be indicated by a scale if desired. In such case, the scale may be geared to the shaft of wheel 82 for slower rotation. This relative change of the two wheels changes the course of the ship. When the hand wheel or clutch wheel is pushed in, the ship may be steered by hand in the usual manner. The small hand wheel will revolve relative to the steering wheel while the ship is being steered by hand, but will not interfere in any manner with the steering. Two small grooves in the hand wheel shaft are engaged by a spring-ball device 84 which keeps it engaged or disengaged. In an emergency while under automatic steering, it is only necessary to push in the hand wheel to return to hand steering.

The purpose of the two driving studs, 71 and 72, disposed as shown, is to prevent continual movement of the steering wheel back and forth while the main motor is making the compass assembly hunt back and forth across the edge of the card. The angular distance between the driving studs is made approximately that required to allow the hunting. It will be seen then that if the clutch is released at the steering wheel, the motor will revolve in one direction or the other until the binnacle carries the light to a point where it picks up one of the two proper edges of the cut-away portion of the card. The motor then reverses and starts a hunting action back and forth. If the ship is now put on any desired course and the sprocket connected to the steering wheel through the clutch, and if the ship retains an absolutely straight course, the steering wheel will not be moved, but should the ship head in one direction or the other, the motor must turn in one direction or the other to again orient the compass assembly with respect to the card, and in so doing one of the driving studs is engaged and the sprocket disc and steering wheel are turned in the appropriate direction as far as is necessary to again cause the light to pick up the edge of the card. This movement of the steering wheel is in the correct direction to restore the ship to the course. It will be seen that as the ship returns to its course, the steering wheel will be continually straightened out so that by the time it is again on course, the rudder will be in its original neutral position. It must be borne in mind that the compass card remains stationary, and if the ship swings to one side or the other it moves the compass assembly with it and in so doing causes the steering motor to revolve in such a way that the compass assembly comes back to its original position with respect to the compass card. It is this movement of the steering motor that turns the steering wheel and rudder in the proper direction to restore the ship to the original course set. It will be seen that the amount of the rudder angle is proportional to the angle which the ship has swung off course. In other words, a considerable swing will give a large amount of rudder angle, while only a small deviation will give a proportionately small amount of rudder angle.

The voltage on the steering motor is reduced to such a point that it revolves very slowly back and forth while it is hunting, but in order to give a quick movement to the rudder, the driving arm 70 has mounted thereon two contacts, 85, 86, which when in contact with either of the driving studs, cause full voltage to be thrown across the steering motor. The action then is very rapid until the light has again caught up with the edge of the cut-away portion of the compass card, when the motor again hunts back and forth between the two studs at a diminished voltage. As the ship returns to the course, the opposite driving stud is engaged by the driving arm, and again full voltage is thrown across the steering motor. In other words, when the steering wheel is being moved, full voltage is across the motor, but while hunting the motor is subjected to a diminished voltage.

In a direct steering apparatus the roll of the ship is quite likely to cause the steering wheel to move back and forth, which would result in the driving studs continually being engaged due to the roll of the ship. In order to avoid this, a friction brake 73' operates on the drum of the sprocket disc. In the case of a plain brake, the friction is constant and is sufficient to keep the steering wheel from moving back and forth due to the roll of the ship, and in the case of a solenoid operated brake, this brake is released when either of the driving studs is engaged by the driving arm. The action in both cases is the same. In the latter, however, the brake is released while the steering gear is being moved, while in the former case, the friction is constant and must be overcome by the steering motor.

The friction brake is sufficiently strong to prevent turning of the steering wheel by the rolling of the ship, as before stated. Since the sprocket makes about five revolutions to one of the steering wheel, it will be seen that it has considerable effect.

The two contacts 85, 86 on the driving arm are insulated from one another and from the arm, and the connections thereto are made through two collector rings 87 and brushes 88. The machine itself is grounded to the negative side of the electrical system through conductor 89 and consequently when either contact and a driving stud are engaged, the circuit is completed as shown by the wiring diagrams, Figures 2 to 6. A further purpose of these two separate contacts is to form an interlock with the reversing switches so that if one of the driving studs is engaged, the motor cannot reverse under full voltage. This lessens considerably the duty on the motor.

The means by which the current through the motor is regulated will now be explained. Auxiliary contacts A' and B' are mechanically connected to the main contacts A and B but are electrically insulated therefrom. Whenever either of the contact 85 or 86 is in engagement with its corresponding stud the circuit controller 90 is energized. If contact 85 engages stud 71 current flows through auxiliary switch A', conductors 91, 92, coil of circuit-controller 90, conductors 93, 94, resistance 95, contact 85, stud 71, and wire 89. If contact 86 engages stud 72, the current flows through auxiliary switch B', conductor 93, the coil of circuit controller 90, conductors 92, 96, resistance 97, contact 86, stud 72 and wire 89. In either case the circuit through the field 59 of motor 36 is completed through a shunt comprising the conductor 98, circuit closing armature and conductor 99, cutting out the hunting resistance 100, and leaving in the steering resistance 101.

The short circuiting of the hunting resistance 100 by means of the circuit controller 90 greatly increases the speed and power of the motor. When the circuit controller 90 is open, all of the resistance is in series with the motor and the motor revolves during hunting very slowly.

The purposes of the interlock features, which include the auxiliary contacts A' and B' on the magnetic switches, the contacts on the driving arm, and the circuit controller 90, are as follows:

(a) To allow the motor to revolve slowly back and forth while it is "hunting". This requires no particular power since it is turning only the compass and not the steering wheel. This reduces the power consumption and the duty on the motor.

(b) When the motor has had to rotate farther in one direction than is normally necessary for the hunting operation, as occasioned by the ship deviating from its course, it engages the proper stud and turns the steering wheel in the proper direction. When the stud is engaged, the motor is given nearly full voltage to turn the wheel quickly.

(c) It will be seen that if reversal should take place at the above instant, as determined by the compass bowl being turned far enough to catch up with the compass card, this reversal would take place under full voltage were not the interlock provided. This would damage the motor.

Figure 3:
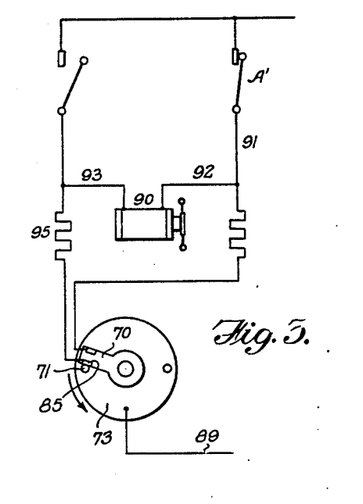
Figure 3 is a diagrammatic view of that portion of the circuits which is instrumental in cutting out part of the resistance in the motor circuit while the motor is driving the steering apparatus. In this view, the driving arm is in engagement with a stud on the drum attached to the rudder operating sprocket wheel and is driving it in counter-clockwise direction. The conductors through which current is flowing are indicated by reference characters.
Figure 4:
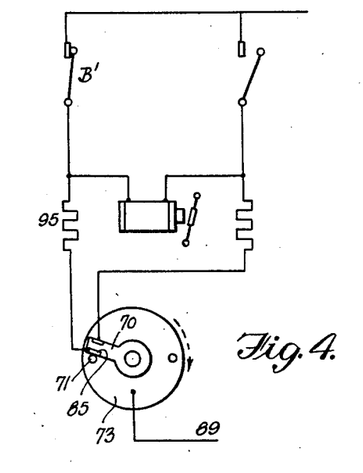
Figure 4 is a similar view showing the parts at the instant of reversal from counter-clockwise to clockwise movement.

The action of the interlock may be clearly seen in Figures 3 to 6. In Figure 3, switch A (not shown) and auxiliary switch A' are closed, arm 70 is driving the drum 73 counter-clockwise and through it the rudder, and current is flowing through auxiliary switch A' and the parts designated by numerals. At this time the circuit controller 90 is energized and consequently the shunt circuit which cuts out the hunting resistance is closed. Therefore, the motor is running with its maximum current supply. Figure 4 shows the same parts at the instant of reversal from counterclockwise to clockwise movement. Switches A, B, A', B' have been reversed and with them the motor circuit, but arm 70 has not yet moved far enough in the clockwise direction to break the contact between parts 85 and 71.

The motor is no longer driving the rudder and if it were still supplied with maximum current, injury would result. Current is flowing through auxiliary switch B' and the other designated parts of Figure 4, but it no longer flows through the coil of circuit controller 90. This reduces the voltage through the motor back to hunting speed voltage and does not damage the motor.

The motor must now revolve in the opposite direction to engage the other driving stud before the contactor of controller 90 will again close and speed up the motor. In the diagrams the driving arm revolves in the direction shown by the solid arrow when magnetic switch A is closed, and in the direction shown by the dotted arrow when switch B is closed.

Figure 5:
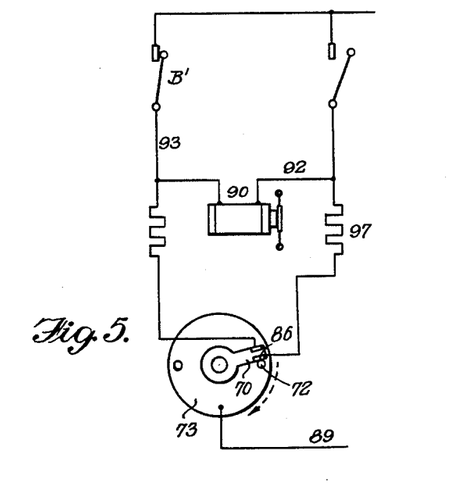
Figure 5 is a view of the same parts when the driving arm is in engagement with the other stud on the sprocket drum and is driving it in clockwise direction.
Figure 6:
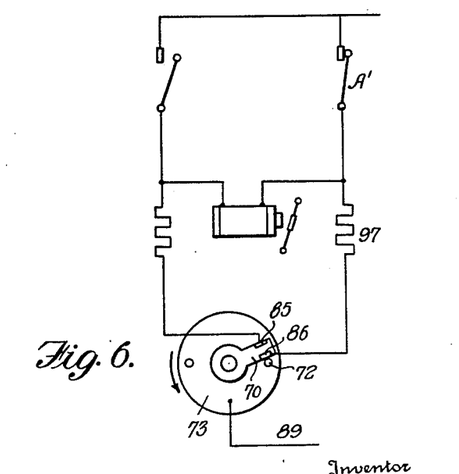
Figure 6 is a view similar to Figure 4 showing the parts at the instant of reversal from clockwise to counter-clockwise direction.

Figures 5 and 6 are diagrams corresponding to Figures 3 and 4 and showing arm 70 at the other extreme of its movement.

The function of the resistances, 95, 97, is to prevent a short circuit when reversal takes place. One of these resistances is directly across the line voltage for the instant that it takes for the contact finger to disengage the driving stud with which it has just been in contact. The relative resistances of the coils 95, 97 (which are identical) and the coil of the circuit controller 90 are such that the contactor operates satisfactorily in series with these resistances.

Gears 102, Fig. 1, allow for a change in the amount of rudder correction for a given deviation from the course. The speed ratio of these gears is fixed for each ship.

In Fig. 13, I have shown a modified form of the compass card, 21', the sectors 22' of which are not integral with the float or body portion, but are spaced therefrom by supports mounted on the body and this forms a structure having all the advantages of a one-piece card but considerably lighter than one of equal diameter. The magnetic elements 21b may be arranged parallel to the north and south line or at an angle thereto.

In the operation of my invention, the movements of the rudder and compass casing are practically synchronized without causing the rudder to partake of slight divergences of the card.

It is important that the casing be continually oriented, but the rudder should not be disturbed by every tremor of the ship or compass. The movements of the motor in opposite directions while hunting, balance each other and amount to zero, so far as their effect on the rudder is concerned. The synchronism of rudder and compass which permits independent movement is an important feature of my invention. Any arrangement that results in the transmission of repeated and violent impulses to the rudder, all to no purpose, is impracticable.

Many changes in the details of my invention may be made without departing from the spirit of my invention. Therefore I do not limit myself to the exact construction and arrangement disclosed, or to the particular instrumentalities, where equivalents may obviously be substituted.

What I claim is:

1. In an automatic steering apparatus, the combination of a rotatably mounted compass, a reversible motor, means a steering element, governed by the deviations of the compass for reversibly operating the motor, driving mechanism from the motor to the compass casing, and driving mechanism from the motor to the steering element, said last-named mechanism including a lost-motion device.

2. In a power-driven steering apparatus, the combination of a reversible power-driven element, a steering element, driving mechanism between said elements, said mechanism including a lost motion device, and a brake for retarding said steering element during the period when said elements are free from each other.

3. In a power-driven steering apparatus, the combination of a reversible power-driven element, a steering element, driving mechanism between said elements, said mechanism including a lost motion device, and means for increasing the power applied to the first-named element when the connecting mechanism is in driving engagement.

4. A device of the character described comprising a driven element, a reversible motor, a lost motion connection between said motor and driven element, whereby either has limited freedom of movement in either direction relative to the other, and means for increasing the motor-energizing current when the connecting mechanism is in driving engagement.

5. The combination with a steering element, a reversible motor for driving said element, a motor circuit including a pair of switches connected in parallel to opposite terminals of said motor for driving it in opposite directions, said motor circuit also including a resistance, power-transmitting mechanism between said motor and element including a reciprocating member and a pair of spaced members cooperating therewith, a pair of contacts on said spaced members, respectively, a pair of contacts on said reciprocating member, a pair of auxiliary switches mechanically connected respectively to said first-named switches, a circuit controller, parallel connections from one side of a source of energy to one pair of said contacts, each leading through a corresopnding auxiliary switch and through said circuit controller, connections between the other pair of contacts and the other side of said source, and a normally open shunt for short circuiting said resistance in the motor circuit, said shunt being closed when the circuit controller is energized.

6. In a power-operated steering apparatus, the combination of a steering shaft, a power-driven element loosely mounted upon the steering shaft, a manually operable steering element fixed with reference to the steering shaft, and a combined clutch and adjusting device for relatively moving and then locking said elements together, said device being manually operable to permit said elements to be locked together in a plurality of different positions.

7. In a power-operated steering apparatus, the combination of a steering shaft, a power-driven element loosely mounted upon the steering shaft, a manually operable steering element fixed with reference to the steering shaft, one of said elements having gear teeth, and a gear wheel mounted on the other element meshing with said teeth, whereby said elements may be adjusted relative to each other.

8. In a power-operated steering apparatus, the combination of a steering shaft, a power-driven element loosely mounted upon the steering shaft, a manually operable steering element fixed with reference to the steering shaft, concentric gear teeth on said elements, and an elongated gear wheel slidingly mounted on one of said elements, said gear wheel meshing with the teeth on both elements when the gear is in one position and with only the teeth on the element on which it is not mounted after it has been slidingly operated.

9. In a power operable steering apparatus, a steering shaft, a manually operable steering element fixedly mounted with reference to the shaft, a power-driven element rotatably mounted upon the shaft, and clutch means for releasably locking said elements together, said means movably engaging both elements to cause a relative movement between them and lock said elements together in a plurality of different positions.

10. In a power operable steering apparatus, a steering shaft, a manually operable steering element fixedly and non-slidably mounted upon the shaft, a power driven element rotatably mounted upon the shaft, and means for relatively moving and releasably securing said elements together in any one of a plurality of angularly adjusted positions.

11. In a power-transmission device, the combination of a driving element, a driven element, concentric gear teeth on said elements, and an elongated gear wheel slidingly mounted on one of said elements, said gear wheel meshing with the teeth on both elements when the gear is in one position and with only the teeth on the element on which it is not mounted after it has been slidingly operated.

12. In a steering apparatus, a steering element, a power-operated shaft, connections between said shaft and steering element including two relatively rotating parts, one of which is a gear wheel, and an adjusting gear rotatably mounted on the other part and rotatable with respect thereto and meshing with said gear wheel to change the relative angular position of said parts and thereby adjust the steering element without moving the power-operated shaft.

13. In a steering apparatus, a steering element, a power-operated element, connections between said elements including two relatively movable members, one of which is toothed, and means for applying manual force in opposite directions to said members including a toothed member engaging the first mentioned toothed member and movably mounted on the other to adjust the steering element without changing the position of the power-operated element.

14. In a steering apparatus, a steering element, an operating element therefor, connections between said elements comprising two relatively movable sections, one section moving with the steering element and the other with the operating element, and means for simultaneously applying external force in opposite directions against two members, one in each section, and for reversing the application of such force, to change the relative position of the sections and thereby adjust the steering element back and forth without changing the position of the operating element.

15. In a steering apparatus, a steering element, an operating element therefor, connections between said elements comprising two relatively movable sections, one section moving with the steering element and the other with the operating element, and a micrometer-like connection between two members, one in each section, to change the relative position of the sections and thereby adjust the steering element without changing the position of the operating element, and means cooperating with said connection for locking said members together in any adjusted position.

16. In a steering apparatus, a steering element, an operating element therefor, connections between said elements comprising two relatively movable sections, one section moving with a steering element and the other with the operating element, and means for holding together and releasing two members, one in each section, and for applying external force simultaneously in opposite directions against said members, to change the relative position of the sections and thereby adjust the steering element without changing the position of the operating element.

17. In an automatic steering apparatus, the combination of a rotatably mounted compass, a steering element, reversible driving means, means governed by the deviations of the compass for reversibly operating the driving means, driving mechanism from the driving means to the compass casing, and driving mechanism from the driving means to the steering element, said last-named mechanism including a lost-motion device.

18. In a steering device, a single source of electricity activated by radiant energy, a source of radiant energy, means to govern the radiant energy which is cast upon the source of electricity, a reversible motor, a rudder driven by the motor, and means to cause the motor to drive the rudder to the right or to the left, or to cease driving it, according as the governing means is in one position or another, or in an intermediate position.

19. In a steering device, a single photoelectric cell, a source of light, means to govern shedding of the light upon the cell, a reversible motor, a rudder driven by the motor, and means to cause the motor to drive the rudder to the right or to the left, or to cease driving it, according as the governing means is in one position or another, or in an intermediate position.

20. In combination with a vessel having a rudder, a steering mechanism comprising a detecting circuit which includes a single element for determining the amount of current in said circuit, said element being dependent upon radiant energy for its operation, means for projecting a beam of radiant energy upon said element, said means and said element being stationary relative to each other, a controlling device, said beam being cut off when said controlling device moves to one side of a predetermined position, and means including a reversible motor, for moving the rudder in one direction during the period when said element is irradiated and in the opposite direction during the period when it is not irradiated.

21. In combination with a vessel having a rudder, a steering mechanism comprising a detecting circuit which includes a single element for determining the amount of current in said circuit, said element being dependent upon radiant energy for its operation, means for projecting a beam of radiant energy upon said element, said means and said element being stationary relative to each other, a controlling device, said beam being cut off when said controlling device moves to one side of a predetermined position, and means including a variable operating circuit controlled from said detecting circuit and having a reversible motor therein for moving the rudder in one direction during the period when said element is irradiated and in the opposite direction during the period when it is not irradiated.

22. Steering apparatus, including in combination with a vessel having a rudder, a reversible motor for operating the rudder, a source of power for energizing the motor, a pair of electrically actuated switches interposed between said motor and said source, adapted respectively when closed to permit a flow of current to the motor to drive it in one direction or the other to turn the rudder, a single photoelectric cell, means for automatically varying the output of said cell when the vessel departs from a given course in either direction, and means to selectively close said switches to move the rudder through the medium of the motor in a direction to swing the vessel toward said course upon a material departure therefrom.

23. Steering apparatus, including in combination with a vessel having a rudder, a reversible motor for operating the rudder, a source of power for energizing the motor, a pair of electrically actuated switches interposed between said motor and said source, adapted respectively when closed to permit a flow of current to the motor to drive it in one direction or the other to turn the rudder, a single photoelectric cell, means for automatically energizing said cell during the period when the vessel departs from a given course in one direction, and for deenergizing the cell during the period when the vessel departs from its course in the opposite direction, and means to selectively close said switches to move the rudder through the medium of the motor in a direction to swing the vessel toward said course upon a material departure therefrom.

24. Steering apparatus, including in combination with a vessel having a rudder, a reversible motor for operating the rudder, a source of power for energizing the motor, a pair of electrically actuated switches interposed between said motor and said source, adapted respectively when closed to permit a flow of current to the motor to drive it in one direction or the other to turn the rudder, a single photoelectric cell, means including a compass and compass card for automatically varying the output of said cell when the vessel departs materially from a given course in either direction, and means to selectively close said switches to move the rudder through the medium of the motor in a direction to swing the vessel toward said course upon a material departure therefrom.

25. Steering apparatus including in combination with a vessel having a rudder, a reversible motor for operating the rudder, a source of power for energizing the motor, a pair of electrically actuated switches interposed between the motor and said source, adapted respectively when closed to permit a flow of current to the motor to drive it in one direction or the other to move the rudder, and means to selectively close said switches to move the rudder through the medium of the motor in a direction to swing the vessel toward its course upon a material departure therefrom, said means including a single photoelectric cell, and a source of light, both the cell and light source being stationary with reference to the vessel, and a compass card adapted to vary the output of said cell with variations of the vessel from its course.

26. In a steering system, a compass card having portions differing in their capacity to transmit radiant energy, a device to convert said radiant energy into electric energy, a steering device, and means between said source of electric energy and said steering device for turning the steering device in one direction when the card is in a right-hand position and in another direction when the card is in a left-hand position, said means exercising insufficient power to turn the rudder when the card is in an intermediate position.

27. In a steering system, a source of radiant energy, a source of electric energy governed by the radiant energy, a compass having means for shedding or withdrawing radiant energy upon or from said source of electric energy, a steering device and means between said source of electric energy and said steering device for turning the steering device in one direction when the compass is in a right-hand position and in another direction when the compass is in a left-hand position, said means exercising insufficient power to turn the rudder when the compass is in an intermediate position.

CURTISS L. HILL.